United States Patent
Peng et al.

(10) Patent No.: US 8,643,245 B2
(45) Date of Patent: Feb. 4, 2014

(54) ROTATIONAL KINETIC ENERGY OUTPUT DEVICE

(75) Inventors: Wen-Yang Peng, Hsinchu County (TW); Jung-Kang Peng, Hsinchu County (TW); Chau-Shin Jang, Hsinchu County (TW)

(73) Assignee: Industrial Technology Research Institute, Hsinchu (TW)

(*) Notice: Subject to any disclaimer, the term of this patent is extended or adjusted under 35 U.S.C. 154(b) by 50 days.

(21) Appl. No.: 13/485,374

(22) Filed: May 31, 2012

(65) Prior Publication Data

US 2013/0093278 A1    Apr. 18, 2013

(30) Foreign Application Priority Data

Oct. 12, 2011    (TW) .............................. 100137005 A (51) Int. Cl.
*H02K 21/38*    (2006.01)
(52) U.S. Cl.
USPC .................................... 310/216.023; 310/268
(58) Field of Classification Search
USPC .................. 310/266, 268, 216.023, 216.024, 310/216.037
See application file for complete search history.

(56) References Cited

U.S. PATENT DOCUMENTS

| | | | | |
|---|---|---|---|---|
| 2,994,023 | A * | 7/1961 | Devol | 318/400.39 |
| 3,673,446 | A * | 6/1972 | Watai et al. | 310/172 |
| 3,745,388 | A * | 7/1973 | Frederick | 310/49.37 |
| 5,786,645 | A * | 7/1998 | Obidniak | 310/68 R |
| 6,492,758 | B1 | 12/2002 | Gianni et al. | |
| 7,411,330 | B2 * | 8/2008 | Kaneko | 310/266 |
| 7,973,446 | B2 * | 7/2011 | Calley et al. | 310/216.061 |
| 2001/0013168 | A1 | 8/2001 | Asao et al. | |
| 2005/0067912 | A1 | 3/2005 | Murakami et al. | |
| 2007/0152522 | A1 | 7/2007 | Enomoto et al. | |
| 2008/0074009 | A1 | 3/2008 | Enomoto et al. | |
| 2008/0278020 | A1 | 11/2008 | Ley et al. | |
| 2009/0284096 | A1 | 11/2009 | Katagiri et al. | |
| 2010/0007225 | A1 | 1/2010 | Platon et al. | |

FOREIGN PATENT DOCUMENTS

| | | |
|---|---|---|
| TW | 553555 | 9/2003 |
| TW | I275228 | 3/2007 |
| TW | M397104 | 1/2011 |

OTHER PUBLICATIONS

Akita et al., A New Core, IEEE Industrial Applications Magazine, Nov./Dec. 2005, pp. 38-43.
Guo et al., Design and Analysis of a Claw Pole Permanent Magnet Motor With Molded Soft Magnetic Composite Core, IEEE Transactions on Magnetics, Oct. 2009, vol. 45, No. 10, pp. 4582-4585.

(Continued)

*Primary Examiner* — Dang Le
(74) *Attorney, Agent, or Firm* — Morris Manning & Martin LLP; Tim Tingkang Xia, Esq.

(57) ABSTRACT

A rotational kinetic energy output device includes a housing component, a rotational component and a magnetism generating component. The rotational component includes a rotational body pivotally connected to the housing component, and the rotational body has at least one magnetic element. The magnetism generating component includes a plurality of magnetizers and coils wound on the magnetizers, the magnetizers are disposed in the housing component and surround the rotational body. Each of the magnetizers has a first magnetic arm and a second magnetic arm extended respectively toward the rotational body, and the rotational body is disposed between the first magnetic arm and the second magnetic arm. Thereby, the rotational kinetic energy output device allows a force to be balancedly exerted on the rotational body and a thin shape is also achieved.

33 Claims, 12 Drawing Sheets (56) References Cited

OTHER PUBLICATIONS

Guo et al., Design and Analysis of a Permanent Magnet Claw Pole/Transverse Flux Motor with SMC Core, IEEE PEDS, 2005, pp. 1413-1418.

Libert et al., Manufacturing Methods of Stator Cores with Concentrated Windings, The 3rd IET International Conference on Power Electronics, Machines and Drives, PEMD 2006, Dublin, Ireland, Apr. 4-6, 2006, pp. 676-680.

* cited by examiner

FIG.12

ROTATIONAL KINETIC ENERGY OUTPUT DEVICE

CROSS-REFERENCE TO RELATED APPLICATIONS

This non-provisional application claims priority under 35 U.S.C. §119(a) on Patent Application No(s). 100137005 filed in Taiwan, R.O.C. on Oct. 12, 2011, the entire contents of which are hereby incorporated by reference.

BACKGROUND

1. Technical Field

The disclosure relates to a rotational kinetic energy output device and more particularly to a thin rotational kinetic energy output device.

2. Related Art

There are many types of motors, if categorized by directions of magnetic flux, and they are divided into axial magnetic flux motor, radial magnetic flux motor and motor having magnetic flux changed from axial to radial (such as claw pole motor). Furthermore, the stators of motors are divided into a few types in terms of structure and application: iron core is structured in one body, structure having independent iron cores, or various coreless or slotless structures.

For a motor stator which has an iron core, the stator is manufactured by stamping magneto-conductive plates to fit the iron core shape, having the plates piled together into layers to form the iron core, and afterwards, having the iron core wound with coils. However, materials are wasted substantially if the abovementioned method is applied in manufacturing a stator of an internal-rotor motor. The larger the power of a motor is, the more materials are wasted in a manufacturing process of iron core, especially for radial magnetic flux motor.

As products are getting more compact and thinner, motor is also required to be developed with thinner design. Typically, axial magnetic flux is mainly applied in motor with thin and compact design. Axial magnetic flux motor can be divided into three types in terms of configuration of rotor and stator, which are single stator and single rotor, dual stator and single rotor as well as dual rotor and single stator.

Motor with single stator and single rotor is the best for meeting the requirements of thinness and compactness. However, a bearing of a motor with a single stator and a single rotor is easily worn out because a force is unevenly exerted on the rotor, which increases the cost of bearings.

If a motor with dual rotor and single stator, or with dual stator and single rotor is employed, besides that a force is evenly exerted on the rotor and therefore, the bearing life is extended, a power or a torque density of the motor can be enhanced as well. However, the motor will be large in size which is a drawback for the requirement of thin and compact design.

SUMMARY

The present disclosure discloses a rotational kinetic energy output device which comprises a housing component, a rotational component and a magnetism generating component. The rotational component includes a rotational body and the rotational body has an axis. The axis is pivotally connected to the housing component, the rotational body has at least one magnetic element. The magnetism generating component includes a plurality of magnetizers and coils wound on the magnetizers, the magnetizers are disposed in the housing component surrounding the rotational body. Each of the magnetizers has a first magnetic arm and a second magnetic arm extended respectively toward the rotational body, and the rotational body is disposed between the first magnetic arm and the second magnetic arm, and the magnetic element correspond to the first magnetic arm and the second magnetic arm.

DETAILED DESCRIPTION

The disclosure relates to a rotational kinetic energy output device, not only that its configuration of components can allow a force to be exerted evenly on a rotor so as to extend a bearing life, but can also meet the requirement of thin and compact design.

The structure and the technical means adopted by the disclosure to achieve the above and other objects can be best understood by referring to the following detailed description of the preferred embodiments and the accompanying drawings.

Figure 1:
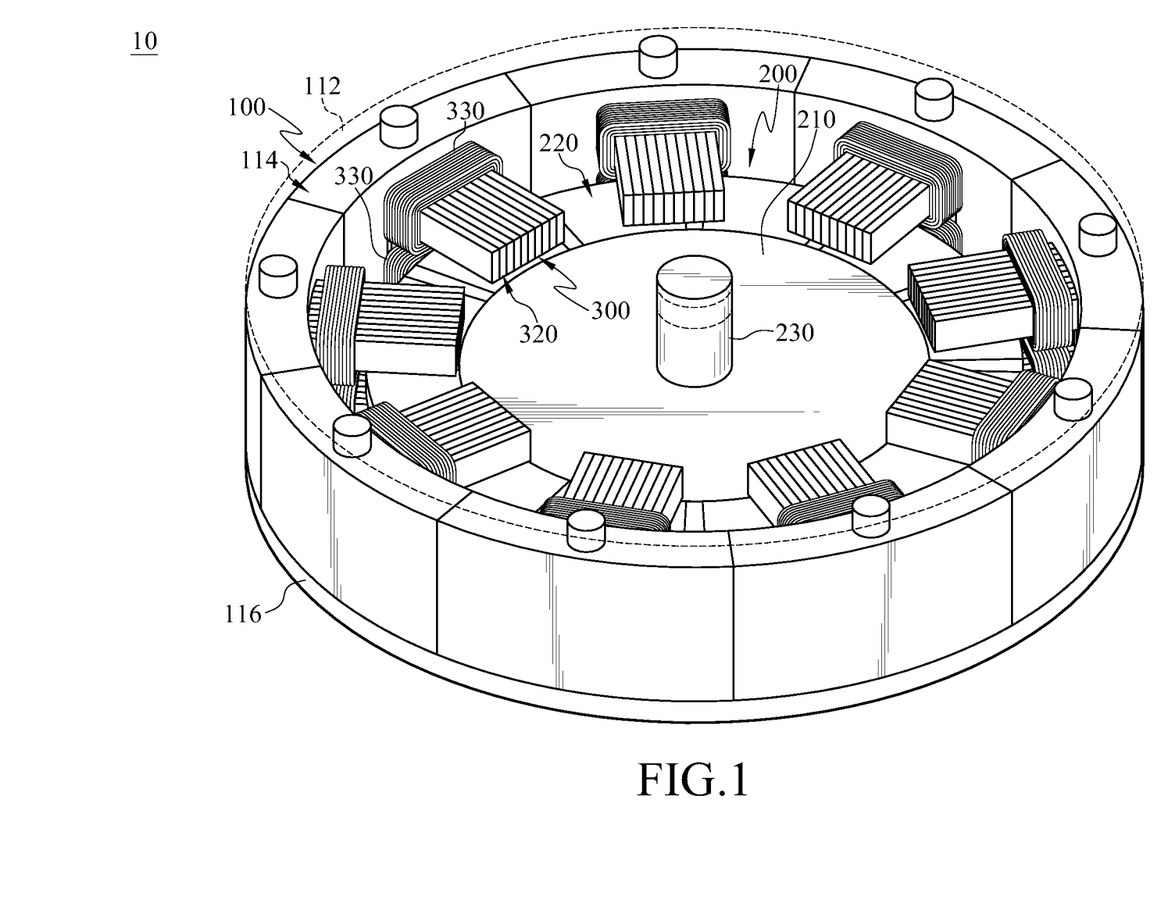
FIG. 1 is a perspective view of a structure of a rotational kinetic energy output device of an embodiment of the disclosure.
Figure 2:
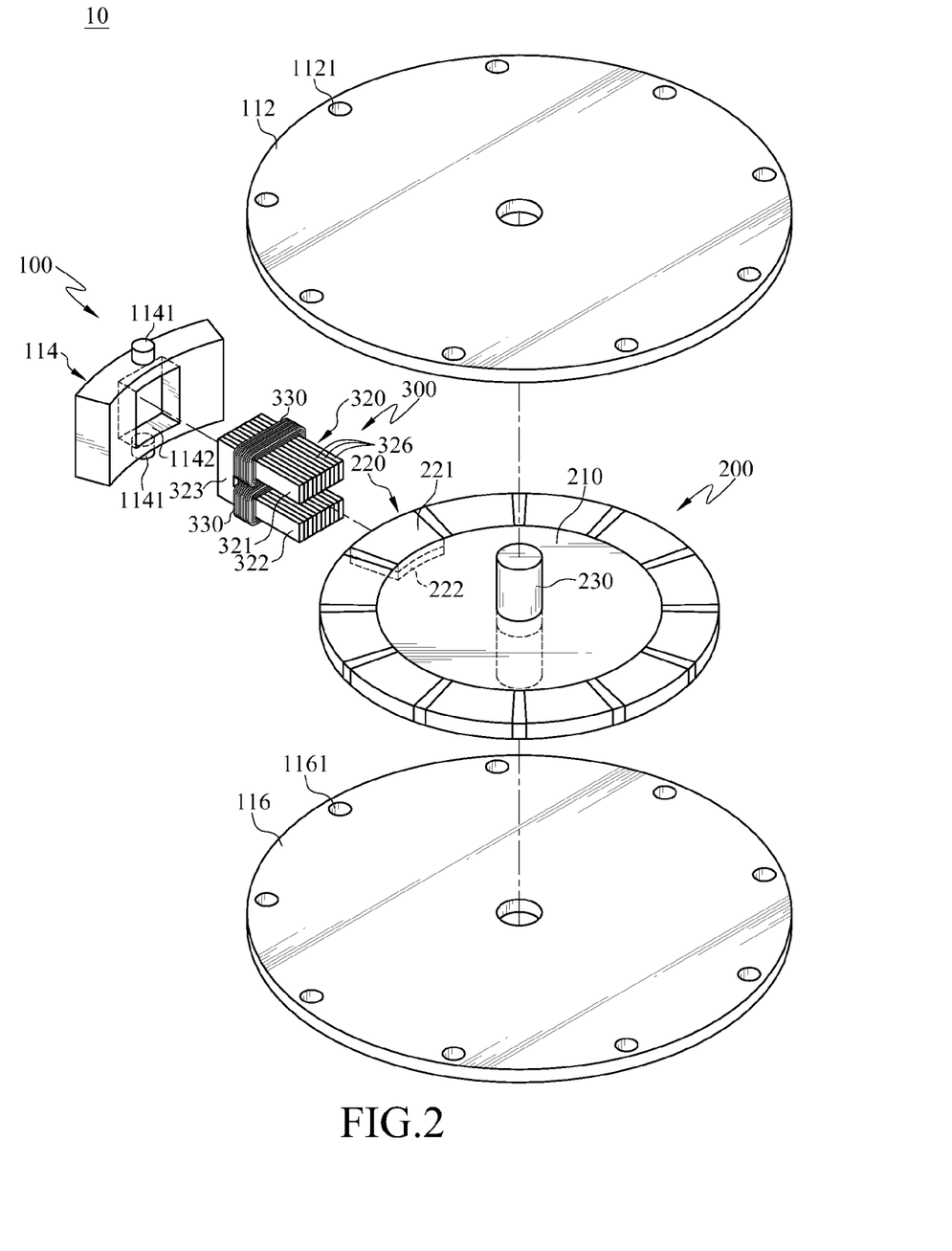
FIG. 2 is an exploded perspective view of a structure of a rotational kinetic energy output device of an embodiment of the disclosure.
Figure 3:
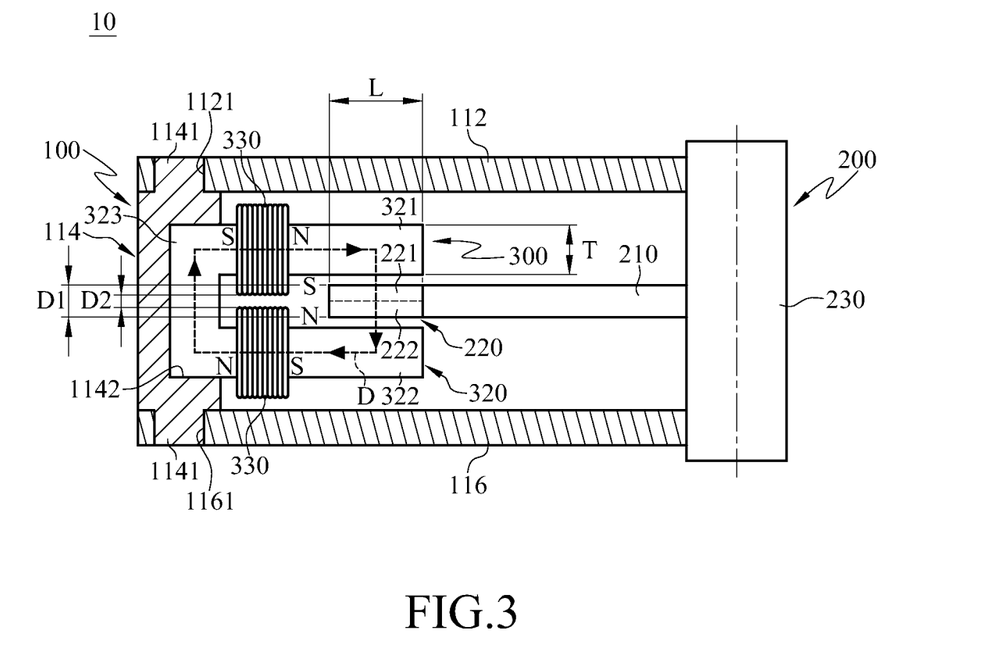
FIG. 3 is a cross-sectional view of a rotational kinetic energy output device and an illustration of a magnetic flux path of an embodiment of the disclosure.

Referring to FIGS. 1 to 3, FIG. 1 is a perspective view of a structure of a rotational kinetic energy output device of an embodiment of the disclosure, FIG. 2 is an exploded perspective view of a structure of a rotational kinetic energy output device of an embodiment of the disclosure, and FIG. 3 is a cross-sectional view of a rotational kinetic energy output device and an illustration of a magnetic flux path of an embodiment of the present disclosure.

In this embodiment, a rotational kinetic energy output device 10 comprises a housing component 100, a rotational component 200 and a magnetism generating component 300. In this embodiment and some embodiments, the housing component 100 includes an upper housing element 112 and a lower housing element 116 disposed oppositely to each other, and a plurality of lateral housing elements 114 disposed between the upper housing element 112 and the lower housing element 116.

The rotational component 200 includes a rotational body 210, and the rotational body 210 is roughly a round plate. An axis 230 is disposed on the rotational body 210, two ends of the axis 230 are pivotally connected respectively to the upper housing element 112 and the lower housing element 116 of the housing component 100, so that the rotational body 210 is disposed between the upper housing element 112 and the lower housing element 116 and capable of rotating in corresponding to the housing component 100. Furthermore, the rotational body 210 has at least one magnetic element 220. In this embodiment and some embodiments, a plurality of the magnetic elements 220 is disposed around the rotational body 210, and each of the magnetic elements 220 is embedded on the rotational body 210. More specifically, the magnetic elements 220 can be permanent magnets, the magnetic element 220 has a first magnetic pole 221 an a second magnetic pole 222 disposed oppositely to each other, and the first magnetic pole 221 and the second magnetic pole 222 are disposed respectively on two opposite sides of the rotational body 210. For convenience of description, only one of the magnetic elements 220 and the corresponding magnetism generating 300 are used.

The magnetism generating component 300 of this embodiment includes a plurality of magnetizers 320 and coils 330 wound on the magnetizers 320, the magnetizers 320 are respectively disposed in the lateral housing elements 114 of the housing component 100 and also surround the rotational body 210. Each of the magnetizers 320 has a first magnetic arm 321 and a second magnetic arm 322 both of which extend respectively toward the rotational body 210, and a gap is maintained between the first magnetic arm 321 and the second magnetic arm 322. A direction of the first magnetic arm 321 to the second magnetic arm 322 is the same as the axial direction of the axis 230. The rotational body 210 is disposed between the first magnetic arm 321 and the second magnetic arm 322 and is not in contact with them. That is, a thickness of the rotational body 210 is smaller than the gap between the first magnetic arm 321 and the second magnetic arm 322. Furthermore, the first magnetic pole 221 and the second magnetic pole 222 face the first magnetic arm 321 and the second magnetic arm 322 respectively.

In addition, in this embodiment and some embodiments, the magnetizer 320 has a connecting arm 323 disposed between the first magnetic arm 321 and the second magnetic arm 322, and the connecting arm 323 is connected to the first magnetic arm 321 and the second magnetic arm 322. More specifically, the first magnetic arm 321, the second magnetic arm 322 and the connecting arm 323 are disposed in such a way that the magnetizer 320 is formed in a horizontal U-shape. Furthermore, the lateral housing element 114 has an inserting groove 1142, a part of the connecting arm 323 of the magnetizer 320 is inserted into the inserting groove 1142.

Furthermore, in this embodiment and some embodiments, the coil 330 is coiled on the first magnetic arm 321 and the second magnetic arm 322 of the magnetizer 320, a distance from the coil 330 to the axis 230 is larger than a largest distance from an edge of the rotational body 210 to the axis 230.

Furthermore, in this embodiment and some embodiments, besides that the magnetizer 320 can be formed in one piece, it can also be composed of a plurality of magneto-conductive plates 326 by piling them with each other. The magneto-conductive plates 326 can be silicon steel plates but not as a limitation thereof.

Referring to FIG. 3, in this embodiment, the first magnetic pole 221 can be a S pole and the second magnetic pole 222 can be a N pole. An inductive electromagnetism generated by an end of the coil 330 coiled on the first magnetic arm 321 which is closed to the axis 230 is a N pole, while an inductive electromagnetism generated by an end of the coil 330 coiled on the second magnetic arm 322 which is closed to the axis 230 is a S pole. Therefore, a magnetic flux path D of the rotational kinetic energy output device 10 of the present embodiment is from the first magnetic arm 321 to the second magnetic arm 322 through the magnetic element 220, then from the second magnetic arm 322 to the first magnetic arm 321 through the connecting arm 323, so that the magnetic flux path D forms a complete magnetic flux circuit. More specifically, the rotational kinetic energy output device 10 of the present embodiment is an axial magnetic flux motor.

Furthermore, a structure of the rotational kinetic energy output device 10 of the present embodiment is thin and compact. The reason lie in that, the magnetizer 320 is structurally designed as a horizontal U-shape, so that the coils 330 are disposed outside the edge of the rotational body 210 and do not have to be disposed directly over or under the rotational body 210. As shown in FIG. 3, because the two coils 330 do not have to be disposed directly over or under the rotational body 210, thus the two coils 330 can be disposed as closed to each other as possible, so that a gap D2 between the two coils 330 is smaller than a thickness D1 of the rotational body 210, therefore a problem with an increased overall thickness of the rotational kinetic energy output device 10 because of disposed positions of the coils 330 can be solved. In addition, because the magnetizer 320 is structurally designed as a horizontal U-shape, so that if a thickness T of the first magnetic arm 321 or the second magnetic arm 322 is larger than a half of a length L of the magnetic element 220 (that is an axially extended length of the magnetic element 220 corresponding to the axis 230), a requirement of magnetic flux density can be meet. Therefore, by having parameters of the length L and the thickness T appropriately adjusted, the overall thickness of the rotational kinetic energy output device 10 can be further reduced.

In addition, because the first magnetic arm 321 and the second magnetic arm 322 of the present embodiment are disposed above or under the upper and the lower sides of the rotational body 210 respectively, thus a force is more evenly exerted on the rotational body 210 and a bearing (not shown) life can be extended.

Furthermore, in this embodiment and some embodiments, a positioning column 1141 is disposed on each of two opposite sides of the lateral housing element 114, a plurality of positioning holes 1121 and 161 are respectively disposed on the upper housing element 112 and the lower housing element 116 corresponding to the positioning columns 1141. The lateral housing element 114 is fixed between the upper housing element 112 and the lower housing element 116 by inserting the two positioning columns 1141 into the positioning holes 1121 and 1161 along an axial direction of the axis 230. Thus, the housing component 100 allows the rotational kinetic energy output device 10 to be conveniently assembled by factory workers and to be easily dismounted for maintenance by mechanics.

Figure 4A:
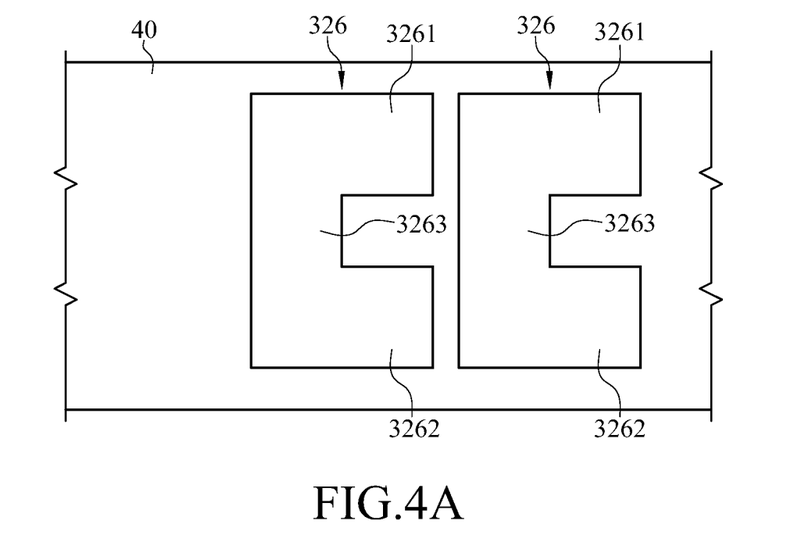
FIG. 4A is an illustration of an arrangement of magneto-conductive plates on a material belt of an embodiment of the disclosure.
Figure 4B:
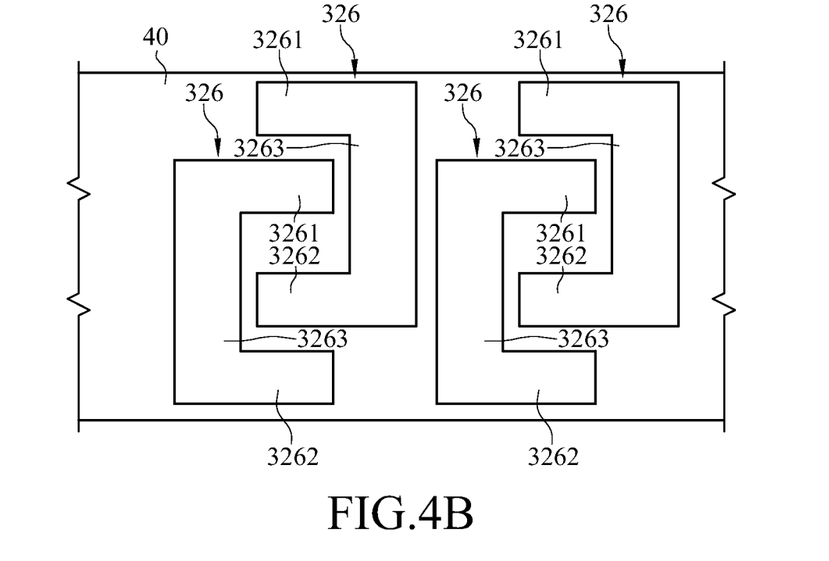
FIG. 4B is an illustration of an arrangement of magneto-conductive plates on a material belt of another embodiment of the disclosure.

Referring to FIGS. 4A and 4B in conjunction with FIG. 2, FIG. 4A is an illustration of an arrangement of magneto-conductive plates on a material belt of another embodiment according to the present disclosure, while FIG. 4B is an illustration of an arrangement of magneto-conductive plates on a material belt of another embodiment according to the present disclosure.

In this embodiment, because the magnetizer 320 can be formed by piling of a plurality of the magneto-conductive plates 326, thus a lower production cost is allowed. The magneto-conductive plates 326 are formed by stamping and cutting of a metal belt 40. The magneto-conductive plate 326 has a first arm 3261, a second arm 3262 and a connecting portion 3263 connecting the first arm 3261 and the second arm 3262. The first arms 3261 of the magneto-conductive plates 326 are piled together to form the first magnetic arm 321, the second arms 3262 of the magneto-conductive plates 326 are piled together to form the second magnetic arm 322, and the connecting portions 3263 of the magneto-conductive plates 326 are piled together to form the connecting arm 323. In other embodiments, if a gap between the first arm 3261 and the second arm 3262 is smaller than a thickness of the first arm 3261 or the second arm 3262, then the two adjacent magneto-conductive plates 326 are arranged side by side facing a same direction on the material belt 40 as shown in FIG. 4A. In other embodiments, if the gap between the first arm 3261 and the second arm 3262 is larger than the thickness of the first arm 3261 or the second arm 3262, then the two adjacent magneto-conductive plates 326 are arranged interlaced and facing each other on the material belt 40 as shown in FIG. 4B, thus less material is wasted from stamping and cutting the material belt 40 to form the magneto-conductive plates 326.

Figure 5A:
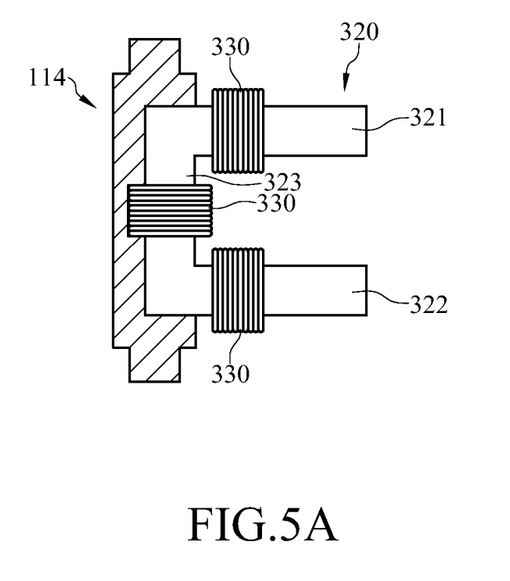
FIG. 5A is an illustration of a magnetism generating component of another embodiment of the disclosure.
Figure 5B:
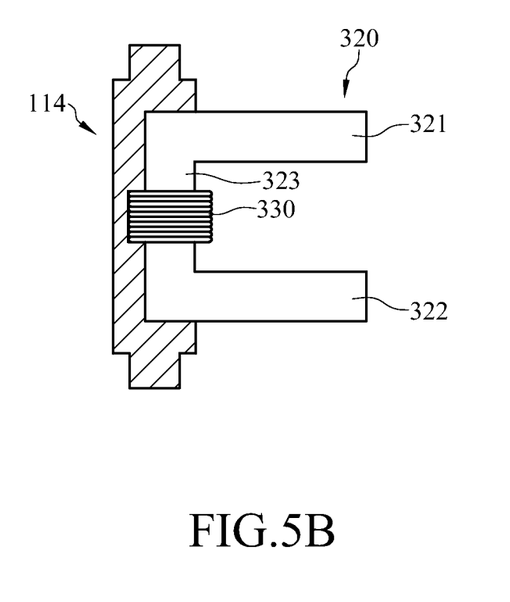
FIG. 5B is an illustration of a magnetism generating component of another embodiment of the disclosure.

Furthermore, the coil 330 in the abovementioned embodiment is coiled on the first magnetic arm 321 and the second magnetic arm 322 of the magnetizer 320, however, this characteristic is not used to limit the present disclosure. For examples, in another embodiment, the coil 330 can be coiled on the first magnetic arm 321, the second magnetic arm 322 and the connecting arm 323 of the magnetizer 320 as shown in FIG. 5A. Or, the coil 330 can be coiled on the connecting arm 323 of the magnetizer 320 only as shown in FIG. 5B.

Figure 6A:
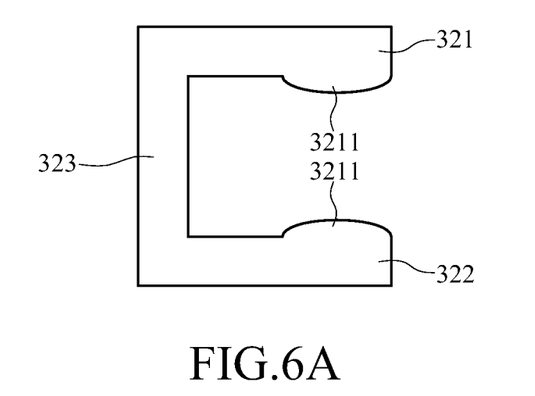
FIGS. 6A to 6C are three illustrations of a magnetizer of another embodiment of the disclosure.
Figure 6B:
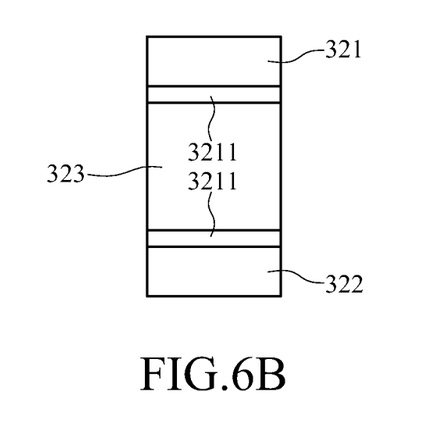
Figure 6C:
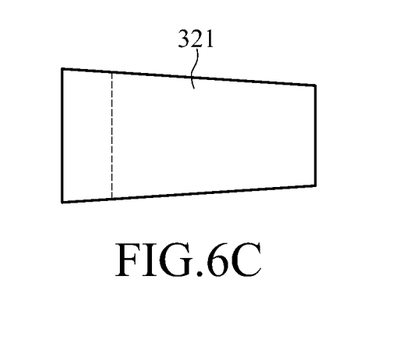
Figure 7A:
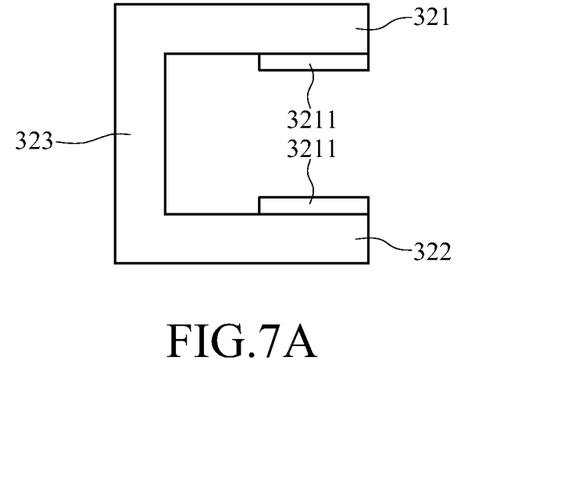
FIGS. 7A to 7C are three illustrations of a magnetizer of another embodiment of the disclosure.
Figure 7B:
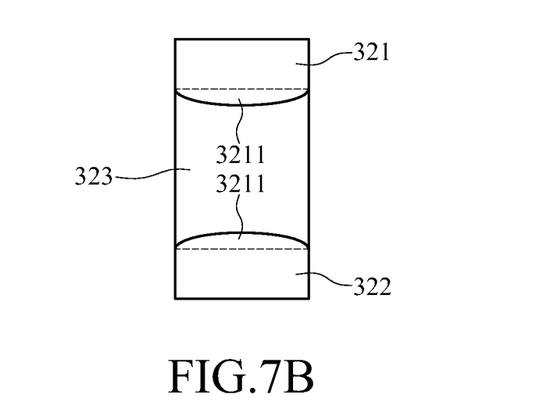
Figure 7C:
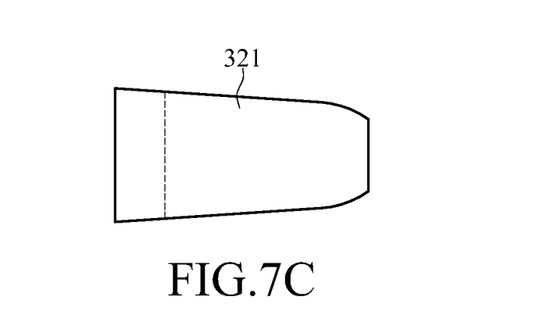

Furthermore, the first magnetic arm 321 and the second magnetic arm 322 of the abovementioned embodiment are columns in a long rectangular shape, however, this characteristic is not used to limit the present disclosure. For examples, in other embodiments, the first magnetic arm 321 can have a first protrusion 3211, while the second magnetic arm 322 can have a second protrusion 3221. In addition, the first magnetic arm 321 and its the first protrusion 3211, as well as the second magnetic arm 322 and its second protrusion 3221 can have surfaces with curvatures or in irregular shapes, as shown in FIGS. 6A to 6C of the magnetizer 320 and in FIGS. 7A to 7C of the magnetizer 320, but not to be construed as limitations thereof.

Figure 8:
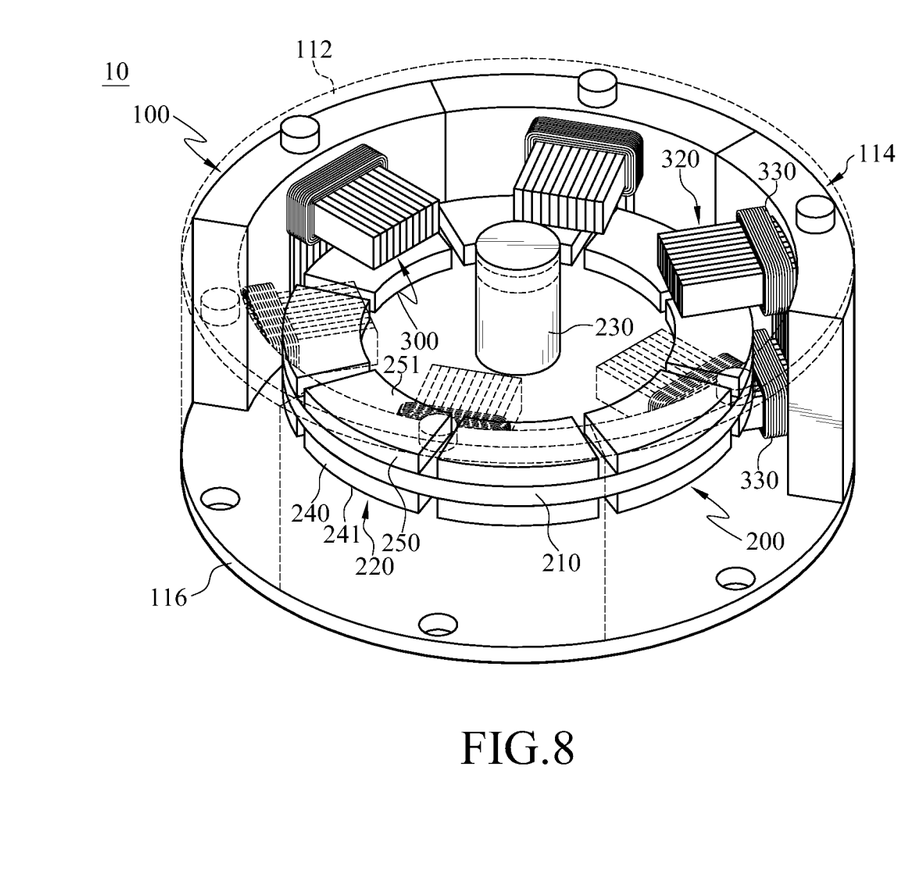
FIG. 8 is a perspective view of a structure of a rotational kinetic energy output device of another embodiment of the disclosure.

Referring to FIG. 8, it shows a perspective view of a structure of a rotational kinetic energy output device of another embodiment of the present disclosure. Because this embodiment is similar to the embodiment in FIG. 1, thus the same features will not be mentioned here again. A plurality of top magnetic elements 240 and bottom magnetic elements 250 are respectively disposed on and surrounding the opposite two sides of the rotational body 210 of the present embodiment. Each of the upper magnetic elements 240 has a first magnetic pole 241 facing the first magnetic arm 321, while each of the bottom magnetic elements 250 has a second magnetic pole 251 facing the second magnetic arm 322.

Figure 9:
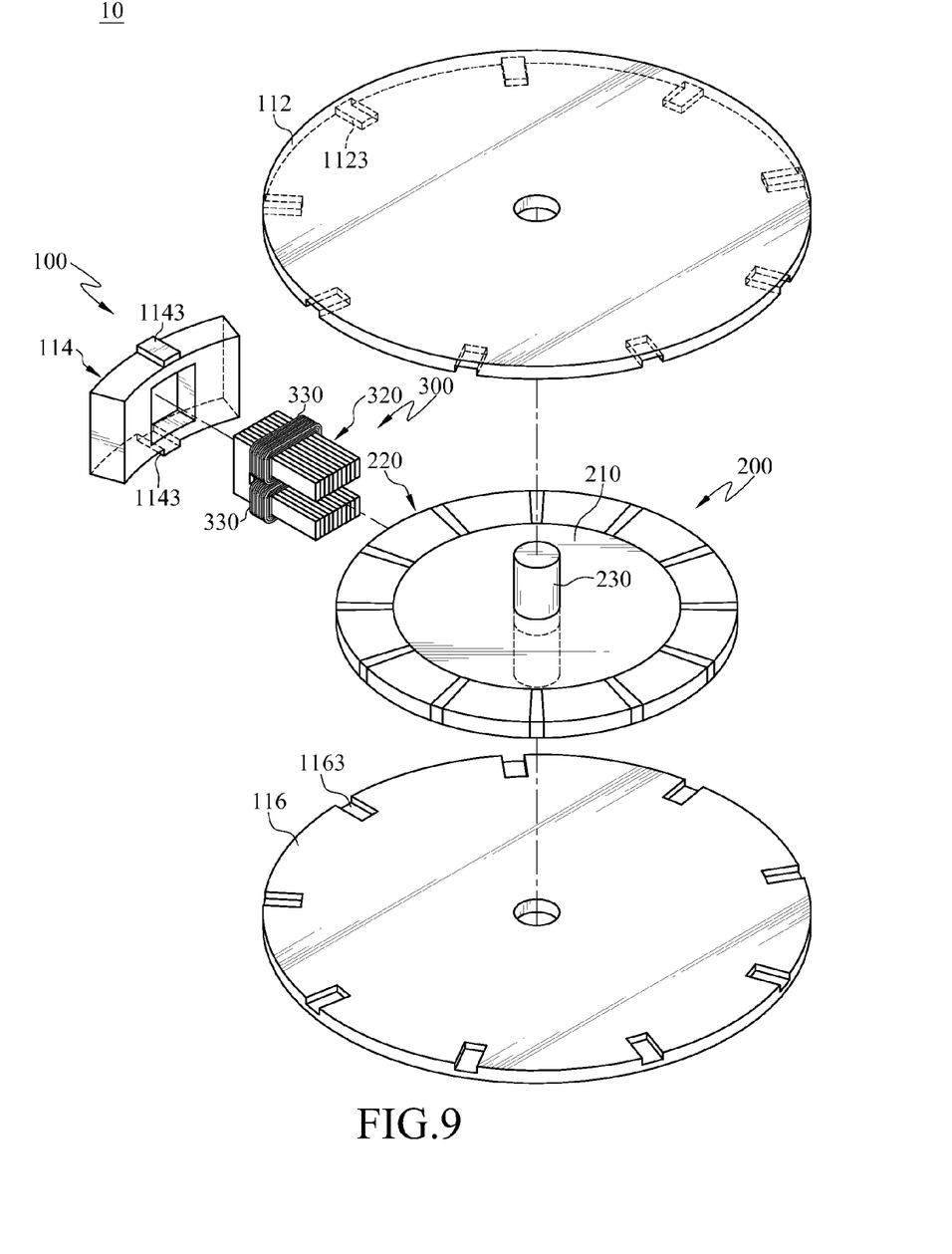
FIG. 9 is an exploded perspective view of a structure of a rotational kinetic energy output device of another embodiment of the disclosure.

Referring to FIG. 9, it shows a perspective view of a structure of a rotational kinetic energy output device of another embodiment of the present disclosure. Because this embodiment is similar to the embodiment in FIG. 1, thus the same features will not be mentioned here again. In this embodiment, a positioning block 1143 is disposed on the two opposite sides of the lateral housing element 114 respectively, the upper housing element 112 and the lower housing element 116 have positioning grooves 1123 and 1163 respectively corresponding to the positioning blocks 1143. The lateral housing element 114 is fixed between the upper housing element 112 and the lower housing element 116 by sliding the two positioning blocks 1143 into the positioning grooves 1123 and 1163 along a radial direction of the axis 230. Thus, the housing component 100 allows the rotational kinetic energy output device 10 to be conveniently assembled by factory workers and to be easily dismounted for maintenance by mechanics.

Figure 10:
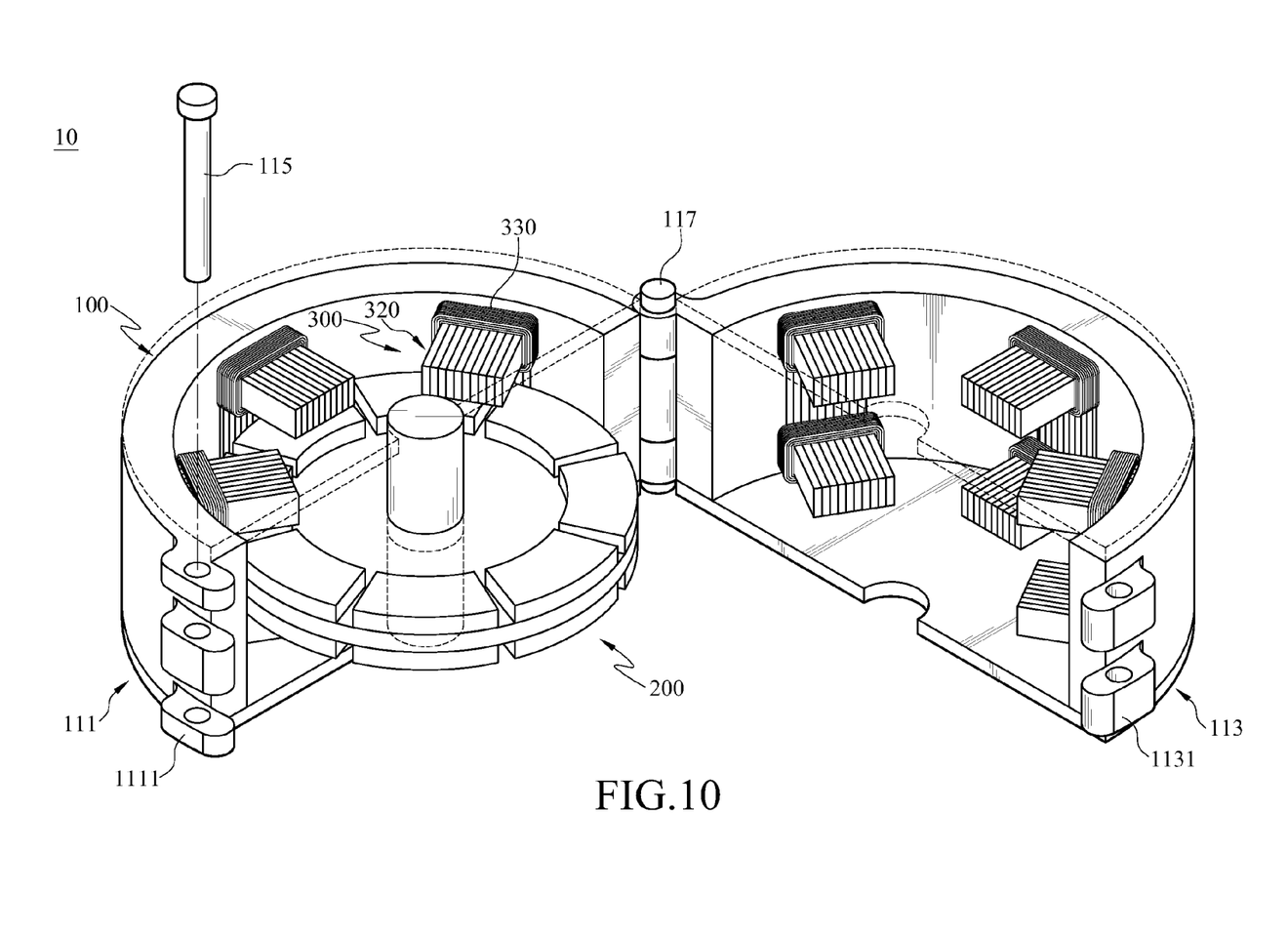
FIG. 10 is a perspective view of a structure of a rotational kinetic energy output device of another embodiment of the disclosure.

Referring to FIG. 10, it shows a perspective view of a structure of a rotational kinetic energy output device of another embodiment of the present disclosure. Because this embodiment is similar to the embodiment in FIG. 1, thus the same features will not be mentioned here again. In this embodiment, the housing component 100 includes a first housing element 111 and a second housing element 113, the first housing element 111 and the second housing element 113 are pivotally connected with each other by a pivot 117. The first housing element 111 and the second housing element 113 have an opening position for placing the rotational component 200, and a closing position for covering the rotational component 200. The magnetism generating component 300 is disposed inside the first housing element 111 and the second housing element 113. When the first housing element 111 and the second housing element 113 are opened, the rotational component 200 can be easily assembled inside the housing component 100. Then, the first housing element 111 and the second housing element 113 can be closed and coupled with each other by having a first coupling portion 1111 disposed at an end opposite to the pivot 117 of the first housing element 111 engaged with a second coupling portion 1131 disposed at an end opposite to the pivot 117 of the second housing element 113. Afterwards, by using a locking element 115 such as a bolt or a screw to insert into the first coupling portion 1111 and the second coupling portion 1131, so that the first housing element 111 and the second housing element 113 are fixed and maintained in the closed position to have the rotational component 200 covered. Thus, structural features of the housing component 100 allow the rotational kinetic energy output device 10 to be conveniently assembled by factory workers and to be easily dismounted for maintenance by mechanics.

Figure 11A:
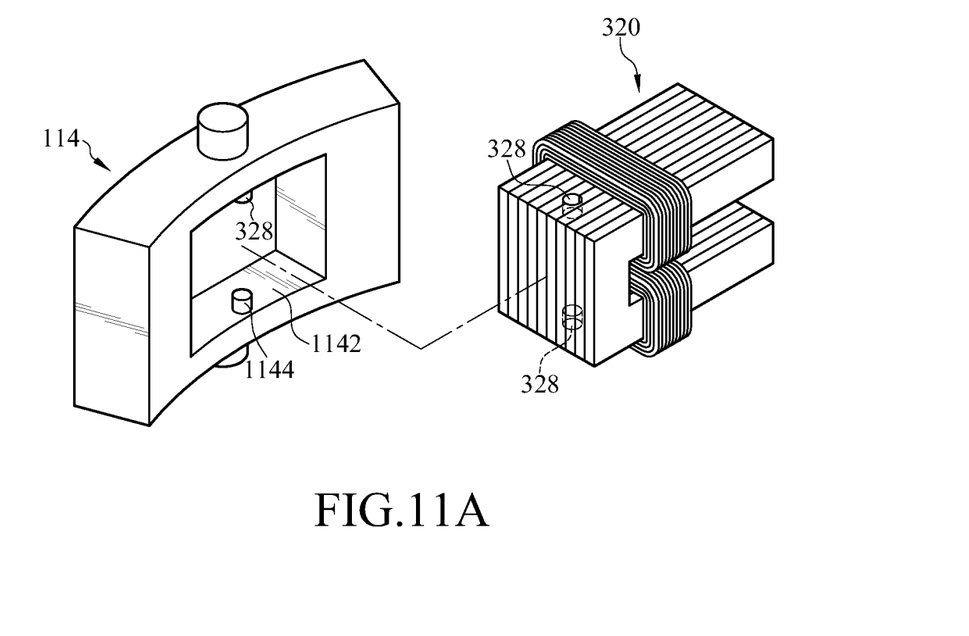
FIGS. 11A and 11B are perspective views of a structure of a magnetism generating component and a housing component of another embodiment of the disclosure.
Figure 11B:
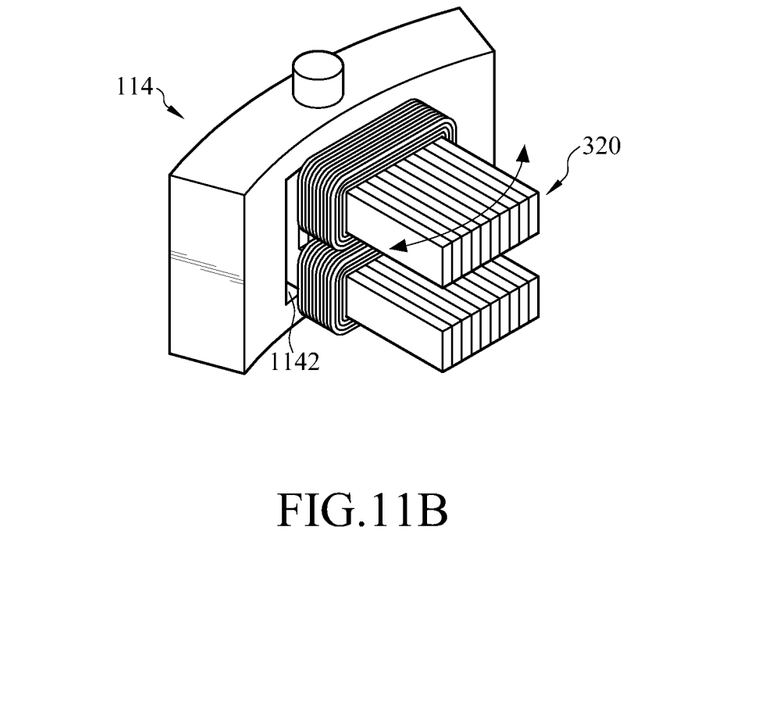

Referring to FIGS. 11A and 11B, they show perspective views of a structure of a magnetism generating component and a housing component of another embodiment of the present disclosure. Because this embodiment is similar to the embodiment in FIG. 1, thus the same features will not be mentioned here again. In this embodiment, the magnetizer 320 has a hole 328, and a protruded column 1144 is disposed inside the inserting groove 1142 of the lateral housing element 114. The protruded column 1144 is inserted into the hole 328, so that a disposing angle of the magnetizer 320 can be finely adjusted after it is pivotally disposed in the lateral housing element 114. Therefore, by using structures such as guiding troughs or positioning blocks (not shown) disposing on the upper housing element, but not as limitations thereof, a pivotal angle of the magnetizer 320 corresponding to the lateral housing element 114 can be adjusted and fixed appropriately, in order to meet offset angles required by different magnetizers 320.

Figure 12:
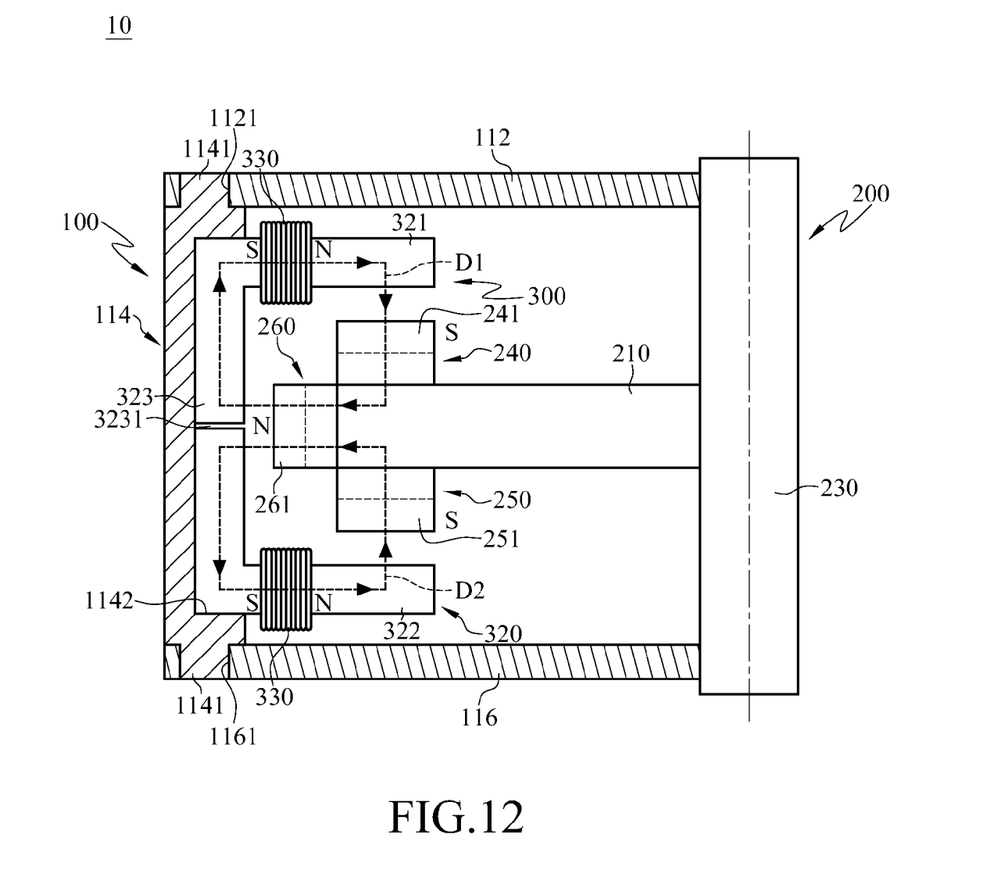
FIG. 12 is a cross-sectional view of a rotational kinetic energy output device and an illustration of a magnetic flux path of another embodiment of the disclosure.

Referring to FIG. 12, it shows a cross-sectional view of a rotational kinetic energy output device and an illustration of a magnetic flux path of another embodiment of the present disclosure. Because this embodiment is similar to the embodiment in FIG. 1, thus the same features will not be mentioned here again. A plurality of top magnetic elements 240 and bottom magnetic elements 250 are respectively disposed on the two sides of the rotational body 210 in this embodiment, and they are disposed around the rotational body 210. Furthermore, a plurality of lateral magnetic elements 260 is disposed on a lateral ringed surface of the rotational body 210. Furthermore, the magnetizer 320 has a trough 3231 extended along an radial direction of the rotational body 210, the trough 3231 divides the connecting arm 323 of the magnetizer 320 into two halves. Furthermore, the top magnetic element 240 has a first magnetic pole 241 facing the first magnetic arm 321, the bottom magnetic element 250 has a second magnetic pole 251 facing the second magnetic arm 322, while the lateral magnetic element 260 has a third magnetic pole 261 facing the trough 3231. The rotational kinetic energy output device 10 of the present embodiment has a first magnetic flux path D1 and a second magnetic flux path D2. The first magnetic flux path D1 is from the first magnetic arm 321 to the top magnetic element 240, then to the connecting arm 323 above the trough 3231 through the lateral magnetic element 260, then, from the connecting arm 323 to the first magnetic arm 321, so that the magnetic flux path D1 forms a complete magnetic flux circuit. Furthermore, the second magnetic flux path D2 is from the second magnetic arm 322 to the bottom magnetic element 250, then to the connecting arm 323 under the trough 3231 through the lateral magnetic element 260, then, from the connecting arm 323 to the second magnetic arm 322, so that the magnetic flux path D2 forms a complete magnetic flux circuit. Thereby, the rotational kinetic energy output device 10 of the present embodiment is a magnetic flux motor changed from axial to radial.

According to the rotational kinetic energy output device of the above embodiment, it employs the magnetizers which each of them has the first magnetic arm and the second magnetic arm extended respectively toward the rotational body to form a horizontal U-shape, thus the rotational body is disposed between the first magnetic arm and the second magnetic arm, so that the rotational kinetic energy output device can allow a force to be balancedly exerted on the rotational body, a thin shape is also achieved, and the heat-dissipation thereof is improved. Furthermore, the housing component in the embodiment has a modular design for easy and convenient assembling and disassembling, therefore it is convenient to be assembled by factory workers and to be dismounted for maintenance by mechanics. In addition, by employing the magnetizers with or without the troughs and with suitable magnetic elements, the rotational kinetic energy output device of the present embodiment can be an axial magnetic flux motor, or a magnetic flux motor changed from axial to radial.

Note that the specifications relating to the above embodiments should be construed as exemplary rather than as limitative of the present disclosure, with many variations and modifications being readily attainable by a person of average skill in the art without departing from the spirit or scope thereof as defined by the appended claims and their legal equivalents.

What is claimed is:

1. A rotational kinetic energy output device, comprising:
   a housing component;
   a rotational component, comprising a rotational body, the rotational body having an axis pivotally connected to the housing component, the rotational body having at least one magnetic element; and
   a magnetism generating component, including a plurality of magnetizers and a plurality of coils wound on the magnetizers, the magnetizers being disposed in the housing component and surround the rotational body, each of the magnetizers having a first magnetic arm and a second magnetic arm extended respectively toward the rotational body, and the rotational body being disposed between the first magnetic arm and the second magnetic arm, and the magnetic element correspond to the first magnetic arm and the second magnetic arm,
   wherein the magnetic element includes an upper magnetic element, a bottom magnetic element and a lateral magnetic element, the upper magnetic element and the bottom magnetic element are disposed on two opposite sides of the rotational body respectively, the upper magnetic element has a first magnetic pole, the bottom magnetic element has a second magnetic pole, the first magnetic pole and the second magnetic pole correspond to the first magnetic arm and the second magnetic arm respectively, the lateral magnetic element is disposed between the upper magnetic element and the bottom magnetic element, the magnetizer has a trough extended along a radial direction of the rotational body, the trough divides the magnetizer into two halves, the lateral magnetic element has a third magnetic pole faces the trough.

2. The rotational kinetic energy output device as claimed in claim 1, wherein a direction from the first magnetic arm to the second magnetic arm is the same as an axial direction of the axis.

3. The rotational kinetic energy output device as claimed in claim 1, wherein a distance from the coils to the axis is larger than a largest distance from an edge of the rotational body to the axis.

4. The rotational kinetic energy output device as claimed in claim 1, wherein the magnetic element is embedded on the rotational body, the magnetic element has a first magnetic pole and a second magnetic pole disposed corresponding to the first magnetic arm and the second magnetic arm respectively.

5. The rotational kinetic energy output device as claimed in claim 1, wherein the coils are wound on the first magnetic arms and the second magnetic arms of the magnetizers respectively.

6. The rotational kinetic energy output device as claimed in claim 1, wherein each of the magnetizers further has a connecting arm to connect the first magnetic arm and the second magnetic arm, the coils are wound on the first magnetic arms, the second magnetic arms and the connecting arms of each of the magnetizers respectively.

7. The rotational kinetic energy output device as claimed in claim 1, wherein each of the magnetizers further has a connecting arm to connect the first magnetic arm and the second magnetic arm, the coils are wound on the connecting arms of each of the magnetizers.

8. The rotational kinetic energy output device as claimed in claim 1, wherein each of the magnetizers includes a plurality of magneto-conductive plates piled together with each other.

9. The rotational kinetic energy output device as claimed in claim 1, wherein the housing component includes an upper housing element and a lower housing element disposed oppositely to each other, and a plurality of lateral housing elements disposed between the upper housing element and the lower housing element, the magnetizers are disposed in the lateral housing elements respectively, the rotational body is disposed between the upper housing element and the lower housing element, the axis is pivotally connected to the upper housing element and the lower housing element.

10. The rotational kinetic energy output device as claimed in claim 9, wherein two positioning columns are disposed respectively on two opposite sides of the lateral housing elements, two positioning holes are respectively disposed on the upper housing element and the lower housing element corresponding to the two positioning columns, the lateral housing element is fixed between the upper housing element and the lower housing element by inserting the two positioning columns into the two positioning holes.

11. The rotational kinetic energy output device as claimed in claim 9, wherein two positioning blocks are disposed on two opposite sides of the lateral housing elements respectively, two positioning groove are disposed respectively on the upper housing element and the lower housing element corresponding to the two positioning blocks, the lateral housing element is fixed between the upper housing element and the lower housing element by sliding the two positioning blocks into the two positioning grooves.

12. The rotational kinetic energy output device as claimed in claim 9, wherein each of the lateral housing elements has an inserting groove, the magnetizers are inserted into the inserting grooves.

13. The rotational kinetic energy output device as claimed in claim 9, wherein the magnetizers are pivotally disposed in the lateral housing elements respectively.

14. The rotational kinetic energy output device as claimed in claim 1, wherein the housing component includes a first housing element and a second housing element pivotally connected with each other, the first housing element and the second housing element have an opening position for placing the rotational component, and a closing position for covering the rotational component.

15. The rotational kinetic energy output device as claimed in claim 1, wherein the magnetizers are in a horizontal U-shape.

16. The rotational kinetic energy output device as claimed in claim 1, wherein the material of the magnetizers is silicon steel.

17. A rotational kinetic energy output device, comprising:
a housing component;
a rotational component, comprising a rotational body, the rotational body having an axis pivotally connected to the housing component, the rotational body having at least one magnetic element; and
a magnetism generating component, including a plurality of magnetizers and a plurality of coils wound on the magnetizers, the magnetizers being disposed in the housing component and surround the rotational body, each of the magnetizers having a first magnetic arm and a second magnetic arm extended respectively toward the rotational body, and the rotational body being disposed between the first magnetic arm and the second magnetic arm, and the magnetic element correspond to the first magnetic arm and the second magnetic arm,
wherein the housing component includes an upper housing element and a lower housing element disposed oppositely to each other, and a plurality of lateral housing elements disposed between the upper housing element and the lower housing element, the magnetizers are disposed in the lateral housing elements respectively, the rotational body is disposed between the upper housing element and the lower housing element, the axis is pivotally connected to the upper housing element and the lower housing element.

18. The rotational kinetic energy output device as claimed in claim 17, wherein a direction from the first magnetic arm to the second magnetic arm is the same as an axial direction of the axis.

19. The rotational kinetic energy output device as claimed in claim 17, wherein a distance from the coils to the axis is larger than a largest distance from an edge of the rotational body to the axis.

20. The rotational kinetic energy output device as claimed in claim 17, wherein the magnetic element is embedded on the rotational body, the magnetic element has a first magnetic pole and a second magnetic pole disposed corresponding to the first magnetic arm and the second magnetic arm respectively.

21. The rotational kinetic energy output device as claimed in claim 17, wherein the magnetic element includes an upper magnetic element and a bottom magnetic element disposed on two opposite sides of the rotational body respectively, the upper magnetic element has a first magnetic pole, the bottom magnetic element has a second magnetic pole, the first magnetic pole and the second magnetic pole correspond to the first magnetic arm and the second magnetic arm respectively.

22. The rotational kinetic energy output device as claimed in claim 21, wherein the magnetic element further includes a lateral magnetic element disposed between the upper magnetic element and the bottom magnetic element, the magnetizer has a trough extended along a radial direction of the rotational body, the trough divides the magnetizer into two halves, the lateral magnetic element has a third magnetic pole faces the trough.

23. The rotational kinetic energy output device as claimed in claim 17, wherein the coils are wound on the first magnetic arms and the second magnetic arms of the magnetizers respectively.

24. The rotational kinetic energy output device as claimed in claim 17, wherein each of the magnetizers further has a connecting arm to connect the first magnetic arm and the second magnetic arm, the coils are wound on the first magnetic arms, the second magnetic arms and the connecting arms of each of the magnetizers respectively.

25. The rotational kinetic energy output device as claimed in claim 17, wherein each of the magnetizers further has a connecting arm to connect the first magnetic arm and the second magnetic arm, the coils are wound on the connecting arms of each of the magnetizers.

26. The rotational kinetic energy output device as claimed in claim 17, wherein each of the magnetizers includes a plurality of magneto-conductive plates piled together with each other.

27. The rotational kinetic energy output device as claimed in claim 17, wherein two positioning columns are disposed respectively on two opposite sides of the lateral housing elements, two positioning holes are respectively disposed on the upper housing element and the lower housing element corresponding to the two positioning columns, the lateral housing element is fixed between the upper housing element and the lower housing element by inserting the two positioning columns into the two positioning holes.

28. The rotational kinetic energy output device as claimed in claim 17, wherein two positioning blocks are disposed on two opposite sides of the lateral housing elements respectively, two positioning groove are disposed respectively on the upper housing element and the lower housing element corresponding to the two positioning blocks, the lateral housing element is fixed between the upper housing element and the lower housing element by sliding the two positioning blocks into the two positioning grooves.

29. The rotational kinetic energy output device as claimed in claim 17, wherein each of the lateral housing elements has an inserting groove, the magnetizers are inserted into the inserting grooves.

30. The rotational kinetic energy output device as claimed in claim 17, wherein the magnetizers are pivotally disposed in the lateral housing elements respectively.

31. The rotational kinetic energy output device as claimed in claim 17, wherein the housing component includes a first housing element and a second housing element pivotally connected with each other, the first housing element and the second housing element have an opening position for placing the rotational component, and a closing position for covering the rotational component.

32. The rotational kinetic energy output device as claimed in claim 17, wherein the magnetizers are in a horizontal U-shape.

33. The rotational kinetic energy output device as claimed in claim 17, wherein the material of the magnetizers is silicon steel.

\* \* \* \* \*